US012266158B2

United States Patent
Bergen et al.

(10) Patent No.: US 12,266,158 B2
(45) Date of Patent: Apr. 1, 2025

(54) SYSTEMS AND METHODS FOR EVALUATING THE ERROR RATE OF HUMAN-GENERATED DATA

(71) Applicant: Ferrum Health Inc., Sunnyvale, CA (US)

(72) Inventors: Leon Bergen, San Diego, CA (US); Kenneth Ko, Santa Clara, CA (US); Pelu Tran, San Francisco, CA (US)

(73) Assignee: Ferrum Health Inc., Sunnyvale, CA (US)

( * ) Notice: Subject to any disclaimer, the term of this patent is extended or adjusted under 35 U.S.C. 154(b) by 496 days.

(21) Appl. No.: 17/700,053

(22) Filed: Mar. 21, 2022

(65) Prior Publication Data

US 2022/0327808 A1    Oct. 13, 2022

Related U.S. Application Data

(60) Provisional application No. 63/168,566, filed on Mar. 31, 2021.

(51) Int. Cl.
*G06V 10/776* (2022.01)
*G06F 40/279* (2020.01)
(Continued)

(52) U.S. Cl.
CPC .......... *G06V 10/776* (2022.01); *G06F 40/279* (2020.01); *G06V 10/764* (2022.01);
(Continued)

(58) Field of Classification Search
CPC .... G06V 10/776; G06V 10/764; G06V 10/98; G06V 20/70; G06V 2201/032;
(Continued)

(56) References Cited

U.S. PATENT DOCUMENTS 8,331,739 B1    12/2012 Abdulkader et al.
8,868,471 B1    10/2014 Hullender
(Continued)

OTHER PUBLICATIONS

"Le Zhang et. al., Disentangling Human Error from the Ground Truth in Segmentation of Medical Images, Dec. 2020, Proceedings of the 34th International Conference on Neural Information Processing Systems, Article No. 1321, pp. 15750-15762" (Year: 2020).*
"Davood Karimi et al., Deep Learning with Noisy Labels: Exploring Techniques and Remedies in Medical Image Analysis, 2020, Mecial Image Analysis ScienceDirect 65, 101759" (Year: 2020).*
(Continued)

*Primary Examiner* — Andrae S Allison
*Assistant Examiner* — Phuong Hau Cai
(74) *Attorney, Agent, or Firm* — FisherBroyles LLP; Alan D. Minsk

(57) ABSTRACT

Systems, apparatuses, and methods for more efficiently and effectively determining the accuracy with which a human evaluates a set of data, as this may reduce the error in the assessment of a model's performance. This can be helpful in situations where human inputs are used to confirm the output of a machine learning generated classification and in situations where it is desired to evaluate the accuracy of data that may have been labeled or annotated by a human curator. This may assist in reducing the need for new validation/test data when evaluating a new model. The system and methods described can be used to evaluate the accuracy of a trained Machine Learning (ML) model, and as a result, allow a comparison between models based on different ML algorithms.

18 Claims, 7 Drawing Sheets

(51) Int. Cl.
*G06V 10/764* (2022.01)
*G06V 10/98* (2022.01)
*G06V 20/70* (2022.01)

(52) U.S. Cl.
CPC .............. *G06V 10/98* (2022.01); *G06V 20/70* (2022.01); *G06V 2201/032* (2022.01)

(58) Field of Classification Search
CPC .. G06F 40/279; G06F 16/215; G06F 18/2178; G06F 16/35; G06F 16/55
See application file for complete search history.

(56) References Cited

U.S. PATENT DOCUMENTS

| | | |
|---|---|---|
| 2008/0103996 A1 | 5/2008 | Forman et al. |
| 2016/0148077 A1 | 5/2016 | Cox et al. |
| 2020/0111572 A1 | 4/2020 | Bergen et al. |

OTHER PUBLICATIONS

"Sen et al., Model-Powered Condition Independence Test, 2017, Part of Advances in Neural Information Processing Systems 30, NIPS 2017" (Year: 2017).*

"T.K. Moon, The Expectation-Maximization Algorithm, Nov. 1996, IEEE Signal Processing Magazine, vol. 13, Issue 6" hereinafter as "Moon" (Year: 1996).*

International Searching Authority of the PCT (US); "Notification of Transmittal of the International Search Report and the Written Opinion of the International Searching Authority, or the Declaration" dated Jul. 1, 2022; PCT Application No. PCT/US2022/021281; pp. 1-11 (2022).

Hong et al.; "Error rates in a clinical data repository: lessons from the transition to electronic data transfer—a descriptive study." BMJ open 3.5 (2013): e002406. May 17, 2013 (May 17, 2013); Retrieved on Jun. 18, 2022 (Jun. 18, 2022) from <https://www.ncbi.nlm.nih.gov/pmc/articles/PMC3657671/> entire document (2013).

* cited by examiner

SYSTEMS AND METHODS FOR EVALUATING THE ERROR RATE OF HUMAN-GENERATED DATA

REFERENCE TO CO-PENDING RELATED APPLICATION

This application claims the benefit of U.S. Provisional Application No. 63/168,566, entitled "Systems And Methods For Evaluating The Error Rate Of Human-Generated Data," filed Mar. 31, 2021, the disclosure of which is incorporated, in its entirety by this reference.

BACKGROUND

Machine learning (ML) is being used more and more to enable the analysis of data and assist in making decisions in multiple industries. To benefit from using machine learning, a machine learning algorithm is applied to a set of training data and labels to generate a "model" which represents what the application of the algorithm has "learned" from the training data. Each element (or example, in the form of variables, characteristics or "features") of the set of training data is associated with a label or annotation that defines how the element should be classified by the trained model. When trained, the model will operate on a new element of input data to generate the correct label or classification as an output.

As a result, the model used to evaluate new data depends on both the set of training data and the ML algorithm used to generate the model. Models may be evaluated in terms of their performance and accuracy at correctly classifying input data. However, there are several factors that may limit a user's ability to understand or predict the performance of a model.

First, in some cases a relatively large set of data may be needed to evaluate the performance of a model. Second, in some use cases or industries, certain types of data may be protected or subject to regulation. Third, complex machine learning models need to be reevaluated each time they are modified, as even minor modifications can lead to large and unpredictable changes in behavior. Fourth, models may need to be reevaluated each time they are deployed in a new environment, as changes in the distribution of data can lead to variations in model performance. These factors can limit the ability to evaluate models and at the least, may create a disincentive to deploy new models or extend existing models to new use cases. A result of this situation is that it may become disadvantageous to attempt to refine or improve a model once an acceptable one is generated. This can lead to continued use of sub-optimal and incorrect models as improved algorithms are developed or new use cases are encountered.

Further, the annotations or labels are often determined by a human who functions as a curator for the set of validation/test data by evaluating the elements of a set of data. The evaluation may take the form of assigning a label to each element of the set. Although annotation may be performed in a semi- or in some cases, fully automated manner, it is most typically done by a person having expertise in the task the trained model is expected to perform.

The evaluation of data may also (or instead) be in the form of a written report. Both labeling approaches can introduce a source of human error into the validation/testing process, and hence into the evaluation of a model's performance. The source of error may be due to the inherent error of the human and/or due to error in understanding the meaning of a written report.

In certain circumstances, labels may be obtained during ordinary operation and use of a model. A human user may provide information about the data that is being input to the model in the form of labels or natural language descriptions. For example, a radiologist may provide a text description of a medical image, or an employee may fill out a checklist after inspecting a manufactured component.

In addition, a user may provide feedback about the accuracy of a model's predictions and classifications. For example, a customer service representative may indicate whether an automated system accurately resolved a customer's question. While it would be desirable to use these incidentally-collected labels and/or information to help evaluate model performance, there may be barriers to doing so. The labels may only be collected under certain limited conditions, for example human input may be solicited only when two different classifiers disagree. As a result, a complete and unbiased set of labeled data may not be available for evaluation.

Systems, apparatuses, and methods are needed for more efficiently and effectively being able to evaluate machine learning algorithms and models, and ideally, without requiring as much data as used for conventional approaches. Further, systems and methods are needed for more efficiently and effectively being able to determine the accuracy with which a human evaluates a set of data, as this may reduce the error in the evaluation of a model's performance. Systems, apparatuses, and methods are also needed to enable users to understand the behavior of a model's performance when used in a new environment. For example, a model that performs well in one hospital (with one patient distribution) may not perform as well in another. Embodiments are directed toward solving these and other problems individually and collectively.

SUMMARY

The terms "invention," "the invention," "this invention," "the present invention," "the present disclosure," or "the disclosure" as used herein are intended to refer broadly to all the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments of the disclosure are directed to systems, apparatuses, and methods for more efficiently and effectively evaluating machine learning algorithms and models, without requiring as much labeled data as used for conventional approaches. Further, embodiments are directed to systems, apparatuses, and methods for more efficiently and effectively determining the accuracy with which a human evaluates a set of data, as this may reduce the error in the assessment of a model's performance.

In some embodiments, the system, apparatuses, and methods described herein may comprise system elements and modules (such as a client application and remote server) that perform one or more of the described functions or operations. Note that in some embodiments or implementations, the following steps, stages, processes, operations, or functions may be performed in a different order than that presented below; for example, an image may be evaluated before, after, or contemporaneously with evaluation of a corresponding written report:

Obtain a Set of Images for Processing;
    Evaluate Each Image Using a Trained machine learning or other model, for example an Image Classifier (e.g., a model or process trained to detect the presence of a nodule in a lung);
Obtain a Written Report of a $1^{st}$ Human Evaluation of Each Image;
    Evaluate Written Report Using Text Classifier or other form of model to determine if $1^{st}$ Human Evaluator Described Finding Nodule in Their Review of the Image;
If the Outputs of the Image and Text Classifier(s) or Models Do Not Agree for an Image, Then Evaluate the Image by a $2^{nd}$ Human (which may be the same or a different person than the $1^{st}$ Human) and Obtain Their Evaluation (note that this evaluation is assumed to be correct/accurate);
Use the Expectation-Maximization Technique[1] to Estimate the Performance of the $1^{st}$ Human and the Image Classifier Given: (1) Performance of Text Classifier or (2) Output of a $1^{st}$ and $2^{nd}$ Text Classifier. In some embodiments, this may comprise:
    Collect Frequencies for Observed Variables, and Define Joint Distribution between Latent and Observed Variables using Conditional Independence Assumptions;
    Generate Initializations for a Set of Distributions;
    For Each Generated Initialization, Perform the Expectation and Maximization Steps to Convergence;
        Select an Output of the Expectation-Maximization Technique that maximizes the likelihood of the Observed Data (the counts observed from actual studies); and
    Present the Selected Output to the User—If Desired, Provide Recommendation Whether the Image Classifier and/or $1^{st}$ Human Evaluation is Reliable Enough for the Task.

[1] In statistics, an expectation-maximization (EM) algorithm is an iterative method to find (local) maximum likelihood or maximum a posteriori (MAP) estimates of parameters in statistical models, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found on the E step. These parameter-estimates are then used to determine the distribution of the latent variables in the next E step.
The EM algorithm is used to find (local) maximum likelihood parameters of a statistical model in cases where the equations cannot be solved directly. Typically, these models involve latent variables in addition to unknown parameters and known data observations. That is, either missing values exist among the data, or the model can be formulated more simply by assuming the existence of further unobserved data points. See Wikipedia entry.

In one embodiment, the disclosure is directed to a system for more efficiently and effectively evaluating machine learning algorithms and models, without requiring as much labeled data as used for conventional approaches. Further, embodiments are directed to a system for more efficiently and effectively determining the accuracy with which a human evaluates a set of data, as this may reduce the error in the assessment of a model's performance. The system may include a set of computer-executable instructions and an electronic processor or co-processors. When executed by the processor or co-processors, the instructions cause the processor or co-processors (or a device of which they are part) to perform a set of operations that implement an embodiment of the disclosed method or methods.

In one embodiment, the disclosure is directed to a set of computer-executable instructions, wherein when the set of instructions are executed by an electronic processor or co-processors, the processor or co-processors (or a device of which they are part) perform a set of operations that implement an embodiment of the disclosed method or methods.

In some embodiments, the systems, apparatuses, and methods described herein for the analysis and evaluation of a human at an image classification task and/or the evaluation of an image classifier for the same task may be provided as services to users through a SaaS or multi-tenant platform. The platform provides access to multiple users, each with a separate account and associated data storage. Each user account may correspond to a hospital or a group of physicians, for example. Each account may access one or more services, an example of which are instantiated in their account and which implement one or more of the methods or functions described.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

BRIEF DESCRIPTION OF THE DRAWINGS

Embodiments in accordance with the present disclosure will be described with reference to the drawings, in which.

DETAILED DESCRIPTION

Figure 1:
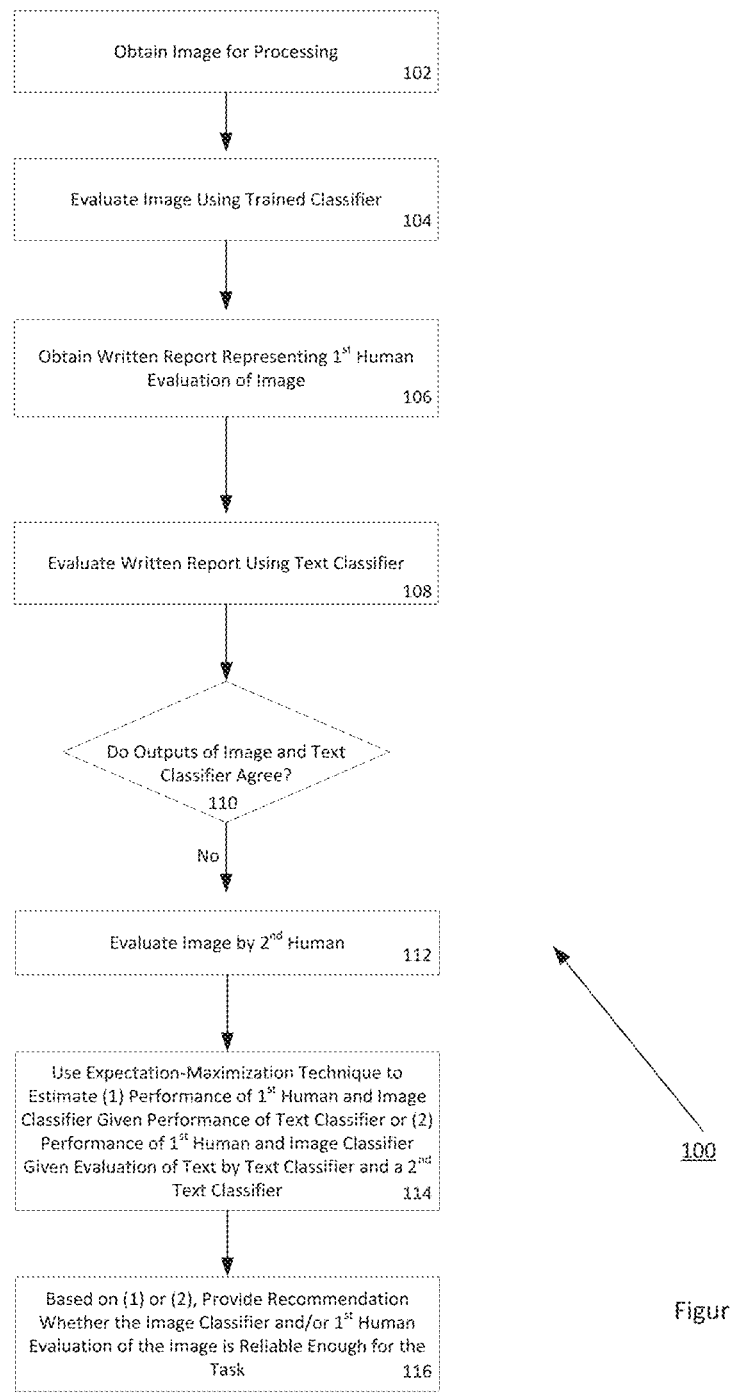
FIG. 1 is a flowchart or flow diagram illustrating a method, process, operation, or function for Evaluating The Error Rate Of Human-Generated Data, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

In some embodiments, the system, apparatuses, and methods described herein enable the evaluation of the error rate of human-generated data in settings where machine-generated data is also available. This can be helpful in situations where human inputs are used to confirm the output of a machine learning generated classification and in situations where it is desired to evaluate the accuracy of data that may have been labeled or annotated by a human curator. This may assist in reducing the need for new validation/test data when evaluating a new model. In other embodiments, the system and methods described herein can be used to evaluate the accuracy of a trained Machine Learning (ML) model, and as a result, allow a comparison between models based on different ML algorithms.

In some embodiments, two trained models are used to evaluate data generated from a common scenario. One of the trained models may be based on an image processing algorithm, with the second trained model based on a natural language processing (NLP) or natural language understanding (NLU) algorithm.

In one example use case, the image being processed is an x-ray or other form of a digital or analog medical imaging scan of a portion of a person's body, and the text being evaluated is a written report or evaluation of the same image by a medical professional (such as a radiologist). Thus, in this example, the same data (the image) is interpreted by both a human (whose evaluation is provided in the form of a written report) and a trained machine learning model.

In some embodiments, the "report" representing an evaluation of an image may include a textual form other than a set of words, phrases, or sentences. For example, in one embodiment the report may contain a code, symbol, or short-hand representation of a diagnosis. The code, symbol, or short-hand representation may comprise one or more alphanumeric characters or symbols for example, where the characters correspond to (that is, can be mapped to) a diagnosis. In such an embodiment, the classifier or model used may be one that is trained to recognize or identify a pattern, code, or symbol.

In one embodiment the system determines if there is a discrepancy between the outputs of the image processing and textual processing models (for example, a difference between how the image is classified and how the text or language is classified). If there is a discrepancy, then an alert or flag is generated. The alert or flag results in a further review of the image by a radiologist (note that although having a different radiologist from the one who did the initial interpretation perform the review may function to remove a potential source of bias, this is typically not necessary as many errors are due to a lapse in attention). A goal of the system and methods described is to determine (a) the accuracy of the initial human-based interpretation, and (b) the accuracy of the image processing and language processing models.

Embodiments are directed to a data analysis method that may be used to determine the error rate of human-generated data in settings where machine-generated data is also available, by using a data processing pipeline that comprises one or more of the following steps or stages. Note that in some embodiments or implementations, the following steps, stages, processes, operations, or functions may be performed in a different order than that presented below; for example, an image may be evaluated before, after, or contemporaneously with evaluation of a corresponding written report:

Evaluating an image using a trained image processing model, such as a machine-learning based classifier, convolutional neural network, machine generated image classifier, or other form of model;

Independently evaluating the same image by a human and capturing their evaluation in a textual form, such as a written report or indication of a code, alphanumeric string, or symbol representing their evaluation (such as their diagnosis);

Evaluating the textual form using a trained machine-implemented language model, such as a text classifier, text interpreter, natural language processing (NLP) model, or other form of model trained to recognize and identify (classify) a set of alphanumeric characters or symbols;

As suggested, the "report" (in whole or in part) representing an evaluation of an image may be in a form other than a set of words, phrases, or sentences. In one embodiment, the report may contain a code, symbol, or short-hand representation of a diagnosis. The code, symbol, or shorthand representation may comprise one or more alphanumeric characters for example, where the characters correspond to (that is, can be mapped to) a diagnosis. In such an embodiment, the classifier or model used may be one that is trained to recognize or identify a pattern or symbol;

Determining if the presence or absence of a feature (such as a node, growth, tumor, etc.) in the image is consistent across the two models or is different;

If the image classifier and human classify/interpret the image in a different manner, generating an alert or flag:

This can occur in either of the following situations (note either of the following may occur and result in an alert, and in some cases, both may occur when evaluating the same image):

(A) Image classifier "detects" a feature, but the text classifier does not indicate the feature being present; or (B) Image classifier does not show ("detect") a feature, but the text classifier indicates the feature being present;

In response to the alert or flag, performing a second evaluation of the image by a human (the same or a different one) to confirm or correct the classification by the image model or the initial human interpretation of the image (as indicated by the text classifier);

If second evaluation indicates presence of the feature, and text does not describe the feature, then (A) represents an error of the initial human interpretation—a false negative for the original human interpreter;

If second evaluation indicates absence of feature, then (A) represents an error of the image classifier—an image classifier false positive;

If second evaluation indicates presence of feature, and text describes the feature, then (A) represents an error of the text classifier—a text classifier false negative;

If second evaluation indicates presence of feature, then (B) represents an error of the image classifier—an image classifier false negative;

If second evaluation indicates absence of feature and text describes the feature, then (B) represents an error of the initial human interpretation—a false positive for the original human interpreter;

If second evaluation indicates absence of feature, and text does not describe the feature, then (B) represents an error of the text classifier—a false positive for the text classifier.

Based on the outputs of the two machine-implemented models and the second human evaluation in cases where a discrepancy between the model outputs is detected, the disclosed process determines (a) machine learning model performance and (b) human performance in the initial interpretation of the image, as reflected by the textual report;

Two cases may be addressed:

Given a known performance of the text classifier or NLP model, the process can provide an estimate of the error rate of the initial human interpretation and an estimate of the image model performance; and Given a situation in which the performance of the text classifier or NLP model is unknown, two text/NLP models (e.g., functioning as a classifier, text recognition, text representation, text interpretation or pattern recognition/matching model) are used and the process can provide an estimate of the error rate of the initial human interpretation, the image model performance, and the performance of each of the two text/NLP models.

In some embodiments, the Expectation-Maximization (EM) technique or method may be used to optimize the distributions considered in the data processing. By performing this optimization, the method estimates quantities of interest (including classifier performance) from the observed data. In these embodiments, a non-limiting example of the processing flow may be as follows:

1. The user inputs the counts for the different observed quantities; for example, the number of samples where the text/NLP and image classifiers/models/evaluations are both positive, or the number of cases which are the result of human error (where the classifiers, models, or evaluations may include one or more of classification, identification, segmentation, and detection functions or operations);

2. When applicable, the user inputs known values for the NLP algorithm performance/accuracy (True Positive Rate (TPR) and False Positive Rate (FPR));

3. The program selects a large number (e.g., 1,000) of initializations for the unknown conditional distributions. Unless otherwise specified, these initializations are randomly selected;

4. For each of the initializations, the program runs the EM algorithm to a state of convergence;

5. From the 1,000 EM process outputs, the program selects the output which maximizes the likelihood of the observed data (as calculated by the marginal likelihood of the data given the output conditional distributions); and 6. The selected conditional distributions are then displayed to the user.

FIG. 1 is a flowchart or flow diagram illustrating a method, process, operation, or function 100 for Evaluating The Error Rate Of Human-Generated Data, in accordance with some embodiments. Note that the process steps or stages prior to use of the Expectation-Maximization technique may be repeated multiple times on different images to obtain the data set used in the technique. That is, the process may first collect data for many images (including comparing human and classifier predictions), aggregate the results, and then input the aggregated results to the Expectation-Maximization step.

Note also that there are multiple orderings of certain of the different steps. For example, "Evaluate Image Using Trained Classifier" can occur before or after "Evaluate Written Report Using Text Classifier". Although in some embodiments, such an image is described as an x-ray, embodiments comprise those in which the image is an X-ray (Computed Radiography, Digital Radiography), a CT (Computed Tomography) scan, a MR (Magnetic Resonance) scan, a US (Ultrasound) image, a MG (Mammography) image, or a photograph, among other examples.

As shown in FIG. 1, an embodiment may begin with obtaining an image for processing (as suggested by step or stage 102). As examples, the image may be of a patient, a scene, an event, an object, etc. The image is evaluated by a trained visual classifier, such as a trained machine learning model or convolutional neural network. The output of the classifier is an indication of the detection or lack of detection of a specific feature, component, structure, or element of the image (as suggested by step or stage 104).

Next, a written report or other form of textual form prepared by a person is obtained that represents the evaluation of the same image with regards to the same feature, component, structure, or element, as suggested by step or stage 106. The written report or other textual format is evaluated using a text classifier, such as a Natural Language Processing (NLP) model, as suggested by step or stage 108. The NLP or other text classifier output is an indication of the detection or lack of detection of a specific feature in the report or other textual format.

As examples, the specific feature may be a word, phrase, sentence, alphanumeric code, or other form of representing a person's evaluation of the image. As also mentioned, the "report" may take forms other than a set of words, phrases, or sentences. For example, a code or short-hand representation of a diagnosis may be represented by a string of letters, numbers, or symbols and may represent a person's diagnosis of what they view in an image.

The method then determines if the outputs of the two classifiers (i.e., the visual or image classifier and the text or NLP classifier) agree or disagree, as suggested by step or stage 110. If the outputs of the two classifiers do not agree (as suggested by the "No" branch of 110), then the image is evaluated by a human being who may be the same or different person than the one who first evaluated the image and prepared the written report, as suggested by step or stage 112.

Next, the Expectation-Maximization technique is applied and as described herein, may be used to perform one of the following:
The performance of the 1st Human evaluator and the Image Classifier Given the Performance of the Text Classifier; or
The performance of the 1st Human evaluator and the Image Classifier Given Evaluation of the Text by a $1^{st}$ Text Classifier and a $2^{nd}$ Text Classifier.

Based on the result of step or stage 114, the method may then provide a recommendation as to whether the Image Classifier and/or the $1^{st}$ Human Evaluation of the Image is Reliable Enough for a Task, as suggested by step or stage 116. For both the Image Classifier and Human Evaluation, the True Positive Rate (TPR) and False Positive Rate (FPR) are estimated. Whether the TPR and FPR are sufficient or acceptable will depend on details of the task. In situations where false negatives are extremely costly (e.g., they correspond to a missed cancer or other potentially serious outcome), one may require a high value for the TPR, while being less sensitive to the FPR. In contrast, in situations where false positives need to be minimized, due to low background prevalence of positives or a high cost of filtering through false positives, one may require or accept a lower value for TPR.

Figure 2:
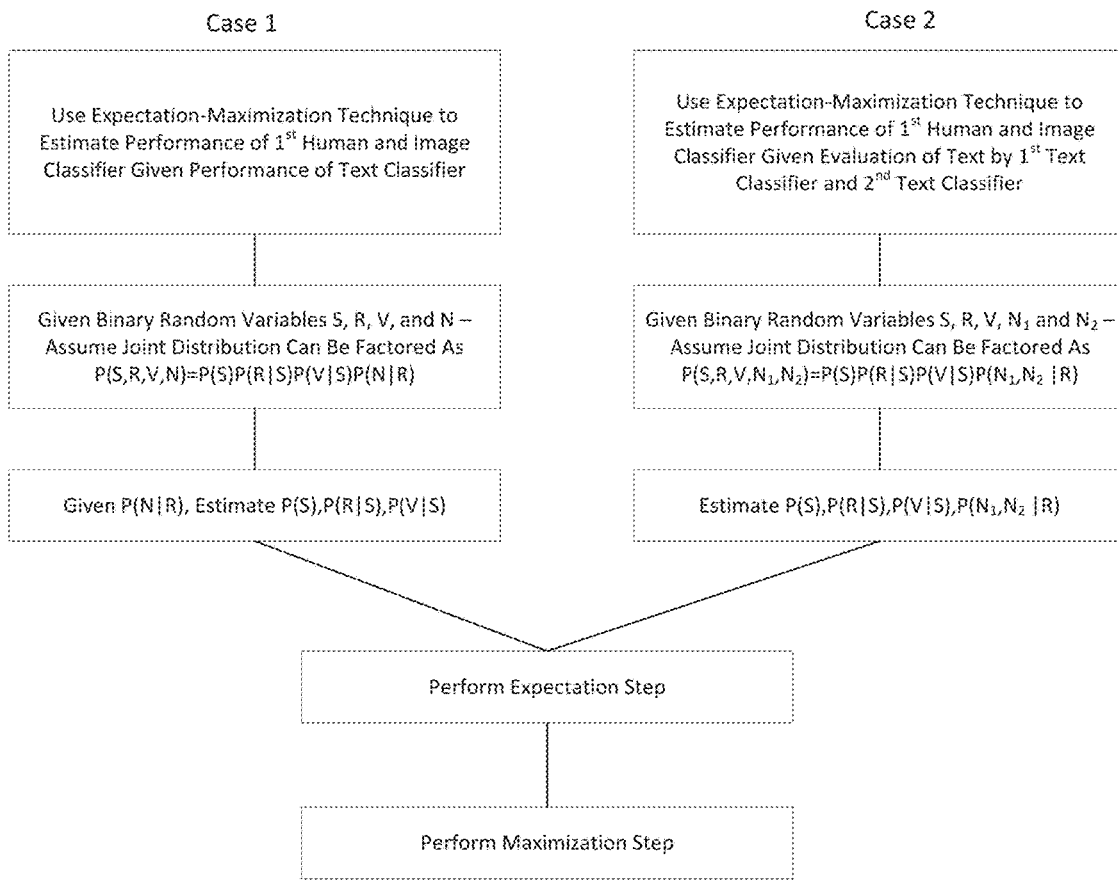
FIG. 2 is a flowchart or flow diagram illustrating certain of the processing steps or stages involved in implementing the method, process, operation, or function of FIG. 1, in accordance with some embodiments.

FIG. 2 is a flowchart or flow diagram illustrating certain of the processing steps or stages involved in implementing the method, process, operation, or function of FIG. 1, in accordance with some embodiments. Note that the Expectation and Maximization steps are each performed multiple times (until the process is complete). That is, the processing first performs an expectation step on the data, then a maximization step, then an expectation step, and so on, in a loop.

As described herein and suggested by the figure, there are two situations or contexts in which the disclosed methodology can provide an estimate of the performance of the 1st Human evaluator and the image (visual) classifier: a first case (identified as Case 1 in the figure) in which the performance of a text classifier is known; and a second case (Case 2) in which the output of a $1^{st}$ and a $2^{nd}$ text classifier are known.

Referring to Case 1 in the figure, the Expectation-Maximization technique is applied to a joint distribution that is assumed to be factored as $$P(S,R,V,N)=P(S)P(R|S)P(V|S)P(N|R),$$

where S, R, V, and N are binary random variables with the following definitions:
S=Study (is the study result positive or negative?)
R=Report (is the radiologist report positive or negative?)
V=Vision algorithm (did the vision algorithm detect a specific element in the study?)
N=Natural language processing algorithm (did the NLP algorithm detect the element described in the report?).

For Case 1, the task is defined as—given P(N|R), Estimate P(S), P(R|S), P(V|S), and is performed by executing the Expectation step or stage followed by the Maximization step or stage.

Referring to Case 2 in the figure, the Expectation-Maximization technique is applied to a joint distribution that is assumed to be factored as $$P(S,R,V,N_1,N_2)=P(S)P(R|S)P(V|S)P(N_1,N_2|R),$$

where S, R, V, and $N_i$ are binary random variables with the following definitions:
S=Study (is the study result positive or negative?)
R=Report (is the radiologist report positive or negative?)
V=Vision algorithm (did the vision algorithm detect a specific element in the study?)
N=Natural language processing algorithm (did the NLP algorithm(s) detect the element described in the report?).

For Case 2, the task is defined as—Estimate P(S), P(R|S), P(V|S), $P(N_1,N_2|R)$, and is performed by executing the Expectation step or stage followed by the Maximization step or stage.

Figure 3:
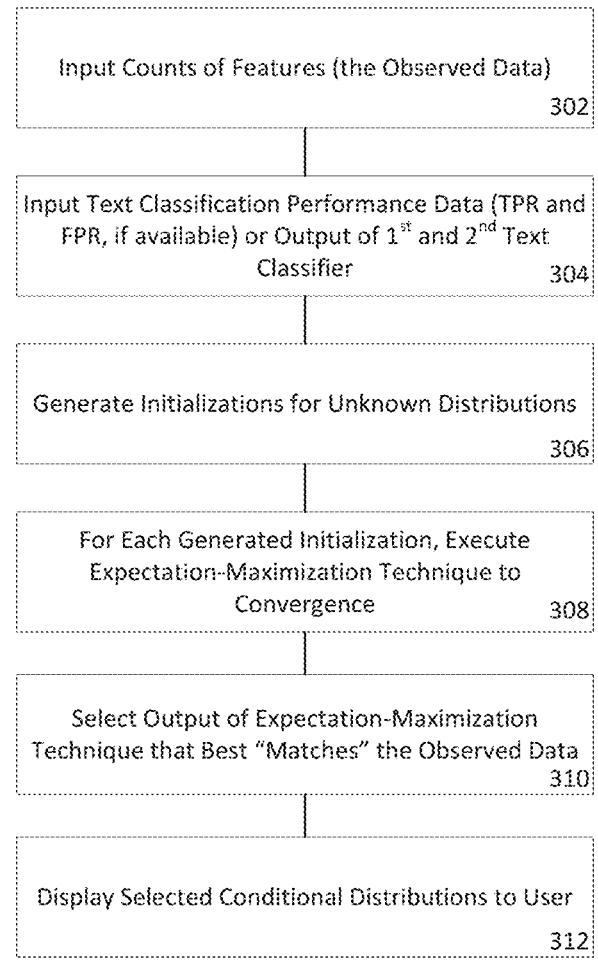
FIG. 3 is a flowchart or flow diagram illustrating the steps or stages involved in implementing an example of the method, process, operation, or function for Evaluating The Error Rate Of Human-Generated Data of FIGS. 1 and 2, in accordance with some embodiments.

FIG. 3 is a flowchart or flow diagram illustrating the steps or stages involved in implementing an example of the method, process, operation, or function for Evaluating The Error Rate Of Human-Generated Data of FIGS. 1 and 2, in accordance with some embodiments. As shown in the figure, a user or system may input the counts for the features of the observed data (as suggested by step or stage 302). As examples, these "counts" may represent the number of samples where the text/NLP and image classifiers/models/evaluations are both positive, or the number of cases which are the result of human error.

Next, the text classifier performance data is provided in the form of TPR and FPR (if available), or the output of a $1^{st}$ and a $2^{nd}$ text classifier are provided, as suggested by step or stage 304. Recall that there are two cases discussed: (1) in which the performance of a text classifier is known; and (2) in which the output of a $1^{st}$ and a $2^{nd}$ text classifier are known. Therefore, the data provided at step or stage 304 represents the appropriate data for the case which represents the study being evaluated.

At step or stage 306, the form of the distributions is defined, and initializations are generated for the distributions, as suggested by step or stage 306. This may include defining binary random variables and factoring of joint distribution(s) of variables—recall that the form of the distributions depends upon the case being evaluated: $P(S, R, V, N) = P(S)P(R|S)P(V|S)P(N|R)$ for Case 1, and $P(S, R, V, N1, N2) = P(S)P(R|S)P(V|S)P(N1, N2|R)$ for Case 2.

For each of the generated initializations from step or stage 306, the expectation-maximization technique is executed until convergence is reached, as suggested by step or stage 308. The output of the expectation-maximization technique that best "matches" the observed data (from step or stage 302) is then selected as the desired conditional distribution, as suggested by step or stage 310. The resulting selected conditional distribution(s) may then be displayed or otherwise provided to the user, as suggested by step or stage 312.

Figure 4:
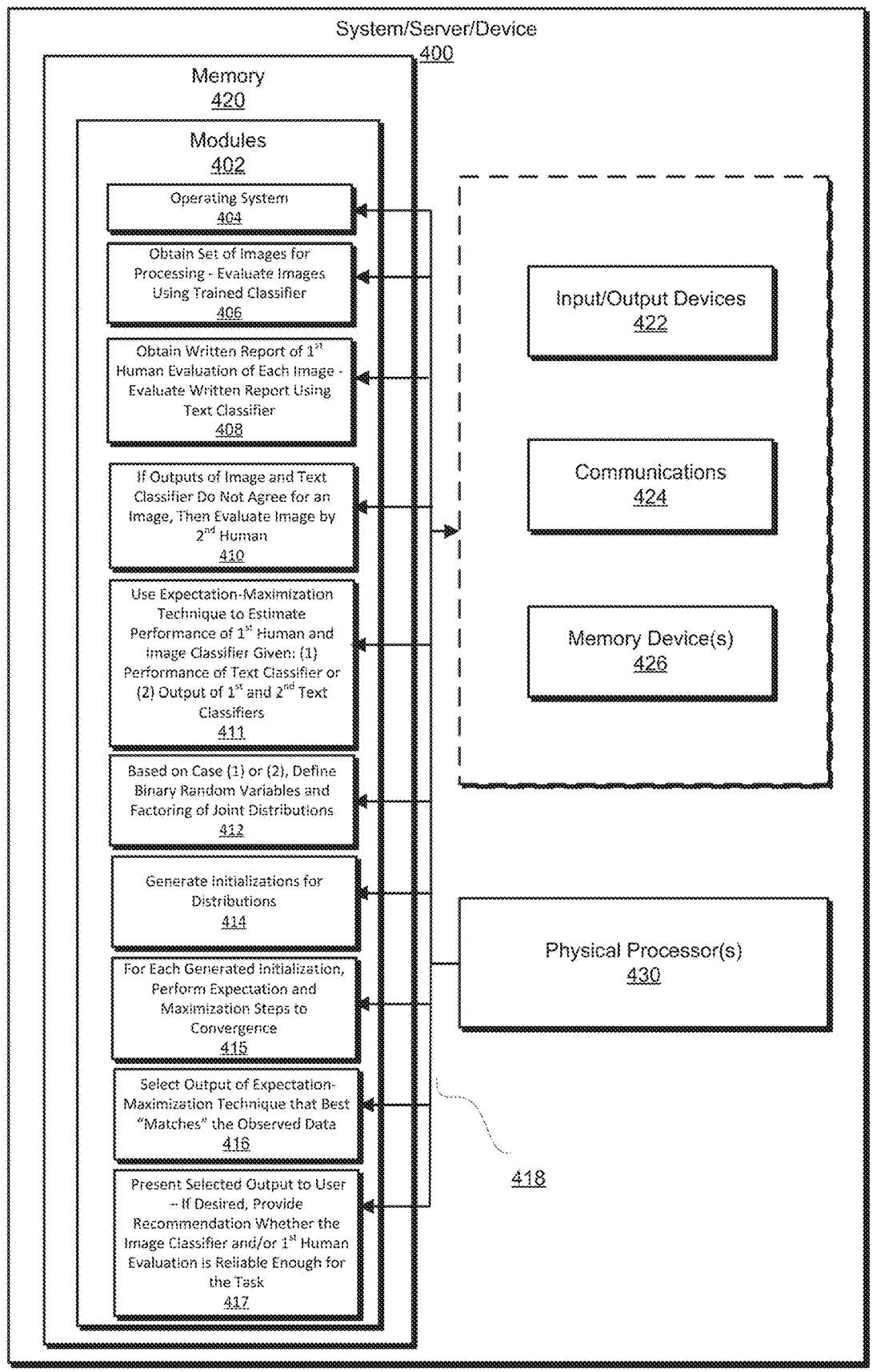
FIG. 4 is a diagram illustrating elements or components that may be present in a computer device, server, or system configured to implement a method, process, function, or operation for Evaluating The Error Rate Of Human-Generated Data in accordance with some embodiments.

FIG. 4 is a diagram illustrating elements or components that may be present in a computing device, server, or system 400 configured to implement a method, process, function, or operation for Evaluating The Error Rate Of Human-Generated Data in accordance with some embodiments. As noted, in some embodiments, the inventive system, apparatuses, and methods may be implemented in the form of an apparatus that includes a processing element and set of executable instructions. The executable instructions may be part of a software application and arranged into a software architecture.

In general, an embodiment may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform. Each module or sub-module may contain a set of computer-executable instructions that when executed by a programmed processor or processors cause the processor or processors (or a device or devices in which they are contained) to perform the specific function, method, process, or operation.

The application modules and/or sub-modules 402 may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As shown in FIG. 4, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function, or method.

Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 418, which also serves to permit processor(s) 430 to communicate with the modules for purposes of accessing and executing a set of instructions. Bus or communications line 418 also permits processor(s) 430 to interact with other elements of system 400, such as input or output devices 422, communications elements 424 for exchanging data and information with devices external to system 400, and additional memory devices 426.

As shown in the figure, modules 402 may contain one or more sets of instructions for performing a method or function described with reference to the Figures, and to the descriptions of the functions and operations provided in the specification (such as the descriptions provided with reference to the Figures). These modules may include those illustrated but may also include a greater number or fewer number than those illustrated. The set of computer-executable instructions that are contained in a single module or in multiple modules may be executed (in whole or in part) by the same processor or by more than a single processor. If executed by more than a single processor, the co-processors may be contained in different devices, for example a processor in a client device and a processor in a server.

For example, certain of the operations or functions performed as a result of the execution of the instructions contained in a module may be the result of one or more of a client device, backend device, or a server executing some or all of the instructions in a module. Thus, although FIG. 4 illustrates a set of modules which taken together perform multiple functions or operations, these functions or operations may be performed by different devices or system elements, with certain of the modules (or instructions contained in those modules) being associated with those devices or system elements.

Each application module or sub-module may correspond to a specific function, method, process, or operation that is implemented by the module or sub-module. Such function, method, process, or operation may include those used to implement one or more aspects of the disclosed system and methods, such as for:

Obtain a Set of Images for Processing;
  Evaluate Each Image Using a Trained Classifier or other form of model (e.g., trained to detect the presence of a nodule in a lung)—as suggested by module 406;
Obtain Written Report of $1^{st}$ Human Evaluation of Each Image;
  Evaluate Written Report Using a trained Text Classifier or other form of model to determine if $1^{st}$ Human Evaluator Described Finding Feature (e.g., nodule) in Their Review of Image—as suggested by module 408;
If Outputs of Image and Text Classifier Do Not Agree for an Image, Then Evaluate Image by $2^{nd}$ Human and Obtain Their Evaluation (which is assumed to be correct)— as suggested by module 410;
Use Expectation-Maximization Technique to Estimate Performance of $1^{st}$ Human and Image Classifier Given: (1) Performance of Text Classifier or (2) Output of $1^{st}$ and $2^{nd}$ Text Classifiers—as suggested by module 411;
Based on Case (1) or (2), Define Binary Random Variables and Factoring of Joint Distribution of Variables (for example, and as described herein, Collect Frequencies for Observed Variables, and Define Joint Distribution between Latent and Observed Variables using Conditional Independence Assumptions)—as suggested by module 412;

Generate Initializations for Set of Distributions—as suggested by module 414;

For Each Generated Initialization, Perform Expectation and Maximization Steps to Convergence—as suggested by module 415;

Select Output Of Expectation-Maximization Technique That Maximizes The Likelihood Of The Observed Data—as suggested by module 416; and Present Selected Output to User—If Desired, Provide Recommendation Whether the Image Classifier and/or $1^{st}$ Human Evaluation is Reliable Enough for the Task—as suggested by module 417.

Note that although embodiments have been described with reference to using an Expectation-Maximization algorithm or technique, there are other methods which may be used to estimate model performance in a statistically consistent manner. These include but are not limited to maximum likelihood estimation using grid search; Bayesian inference with an informative or non-informative prior, with the posterior computed using Markov Chain Monte Carlo; and Bayesian inference with a maximum a posteriori (MAP) estimate.

As mentioned, the "report" (in whole or in part) representing an evaluation of an image may be in a form other than a set of words, phrases, or sentences. In one embodiment, the report may contain a code, symbol, or short-hand representation of a diagnosis. The code, symbol, or short-hand representation may comprise one or more alphanumeric characters for example, where the characters correspond to (that is, can be mapped to) a diagnosis. In such an embodiment, the classifier or model used may be one that is trained to recognize or identify a pattern or symbol. For example, the textual form may be evaluated by a trained machine-implemented language model, such as a text classifier, text interpreter, or other form of model, where the referred to NLP model or models may be replaced by a trained model functioning as a classifier, text recognition, text representation, text interpretation or pattern recognition/matching model.

Figure 5:
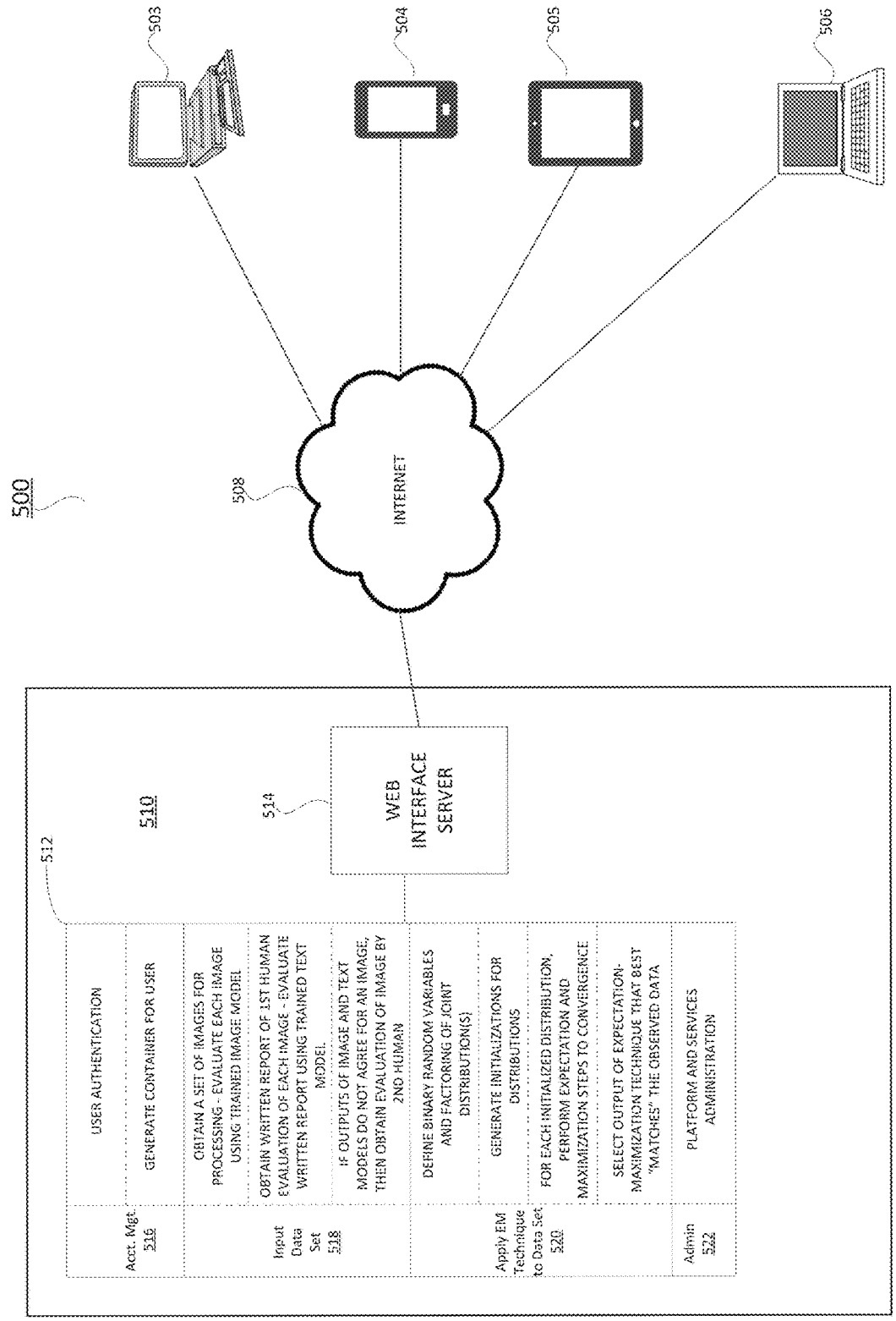
FIGS. 5-7 are diagrams illustrating an architecture for a multi-tenant or SaaS platform that may be used in implementing an embodiment of the systems, apparatuses, and methods described herein.
Figure 6:
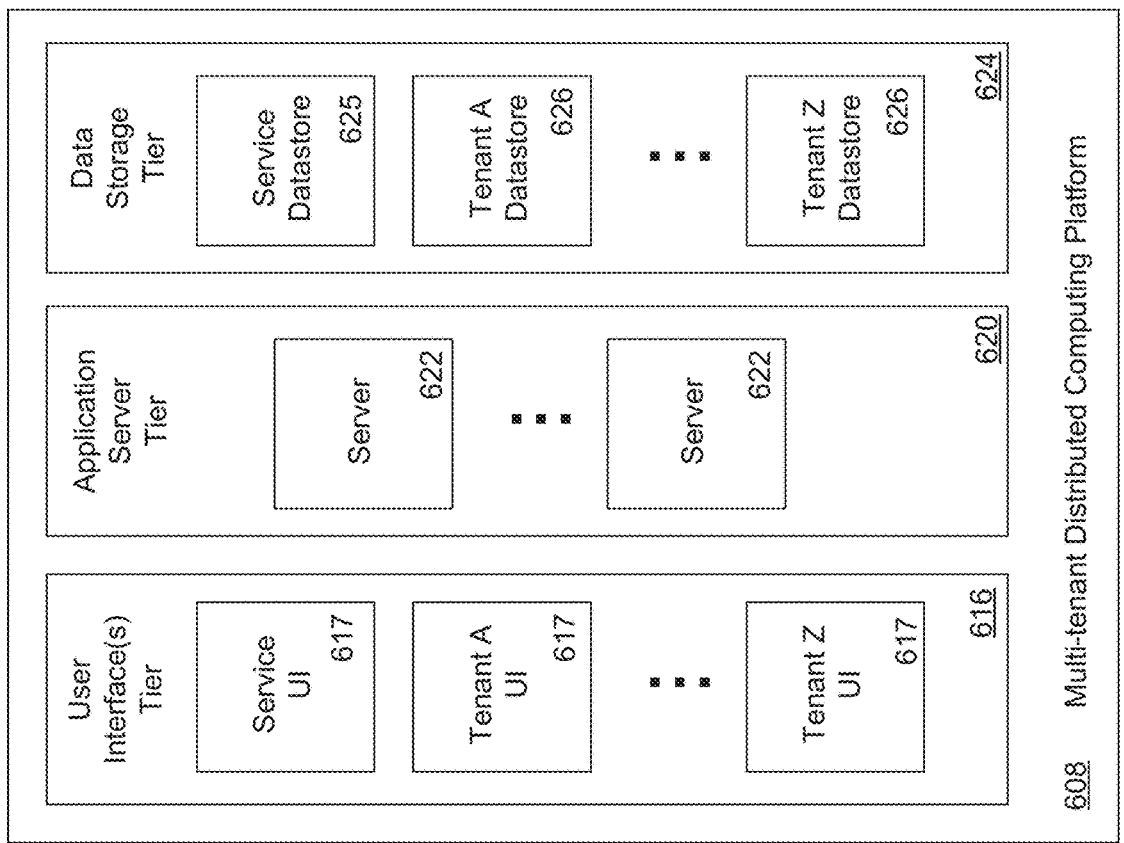
Figure 6:
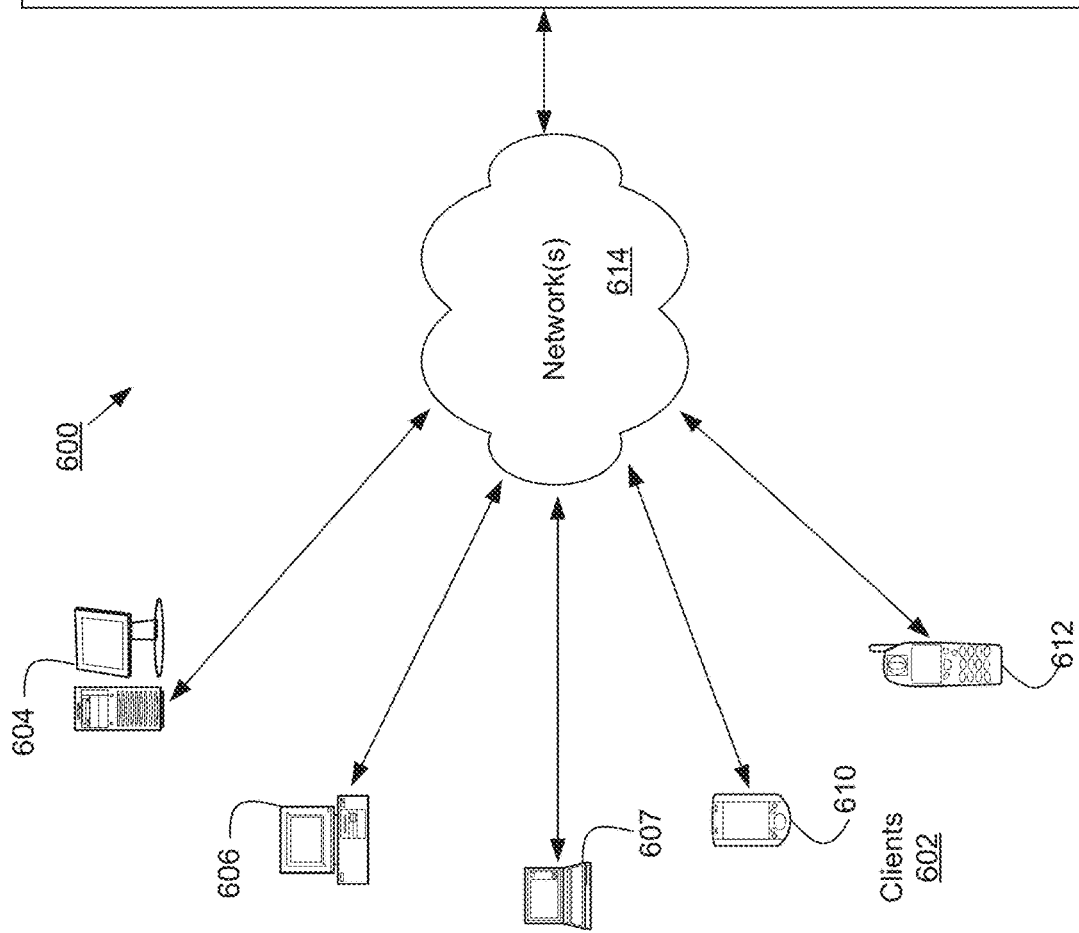
Figure 7:
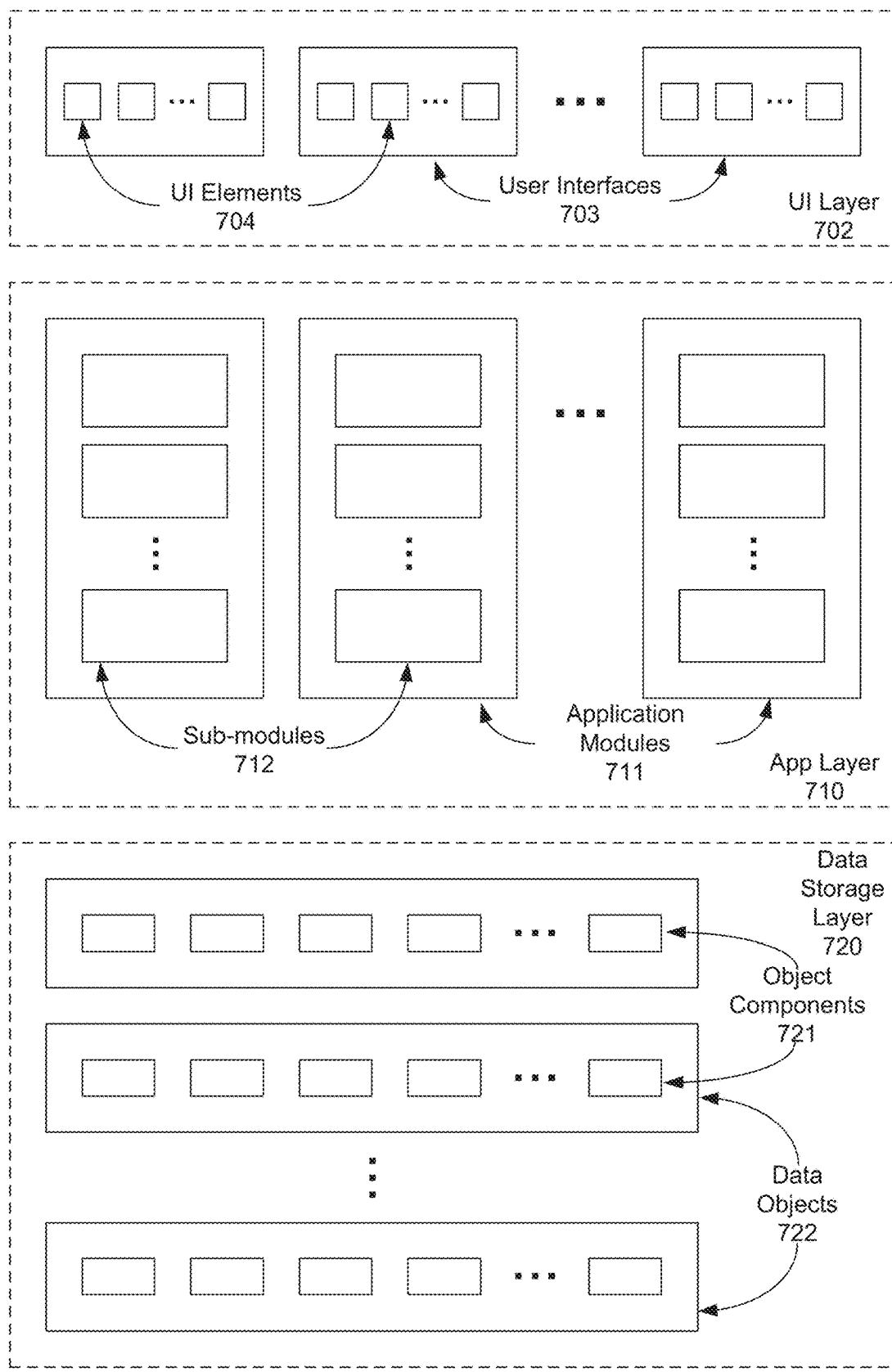

In some embodiments, the functionality and services provided by the system, apparatuses, and methods described herein may be made available to multiple users by accessing an account maintained by a server or service platform. Such a server or service platform may be termed a form of Software-as-a-Service (SaaS). FIG. 5 is a diagram illustrating a SaaS system in which an embodiment may be implemented. FIG. 6 is a diagram illustrating elements or components of an example operating environment in which an embodiment may be implemented. FIG. 7 is a diagram illustrating additional details of the elements or components of the multi-tenant distributed computing service platform of FIG. 6, in which an embodiment may be implemented.

In some embodiments, the systems and methods disclosed may be integrated with clinical programs or studies, or with hospital data management systems. This may allow use of the described techniques and methods in the context of a study and/or with actual data being generated in a clinical setting. For example, a hospital or medical group may maintain an account on a SaaS platform and link that account to a system that manages data generated by the hospital or group for evaluation of human generated data or a model being trained using the data.

In some embodiments, the system or services described herein for Evaluating The Error Rate Of Human-Generated Data may be implemented as microservices, processes, workflows or functions performed in response to the submission of a set of input data. The microservices, processes, workflows or functions may be performed by a server, data processing element, platform, or system. In some embodiments, the data analysis and other services may be provided by a service platform located "in the cloud". In such embodiments, the platform may be accessible through APIs and SDKs. The functions, processes and capabilities described herein and with reference to the Figures may be provided as microservices within the platform. The interfaces to the microservices may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide an evaluation of the error rate of human generated data, as described herein. Although in some embodiments, a platform or system of the type illustrated in FIGS. 5-7 may be operated by a $3^{rd}$ party provider to provide a specific set of business-related applications, in other embodiments, the platform may be operated by a provider and a different business may provide the applications or services for users through the platform.

FIG. 5 is a diagram illustrating a system 500 in which an embodiment may be implemented or through which an embodiment of the services described herein may be accessed. In accordance with the advantages of an application service provider (ASP) hosted business service system (such as a multi-tenant data processing platform), users of the services described herein may comprise individuals, businesses, stores, organizations, etc. A user may access the services using any suitable client, including but not limited to desktop computers, laptop computers, tablet computers, scanners, smartphones, etc. In general, any client device having access to the Internet may be used to provide data to the platform for processing and evaluation. A user interfaces with the service platform across the Internet 508 or another suitable communications network or combination of networks. Examples of suitable client devices include desktop computers 503, smartphones 504, tablet computers 505, or laptop computers 506.

System 510, which may be hosted by a third party, may include a set of data analysis and other services to assist in evaluating the error rate of human generated data 512, and a web interface server 514, coupled as shown in FIG. 5. It is to be appreciated that either or both of the data analysis and other services 512 and the web interface server 514 may be implemented on one or more different hardware systems and components, even though represented as singular units in FIG. 5. Error Rate Evaluation Services 512 may include one or more functions or operations for the evaluation of data to determine the error rate of a human interpreter of the data and/or a trained model used to evaluate the same data.

As examples, in some embodiments, the set of functions, operations or services made available through the platform or system 510 may include:

Account Management services 516, such as
  a process or service to authenticate a user wishing to submit a set of data for analysis and evaluation;
  a process or service to generate a container or instantiation of the data analysis and evaluation services for the data;
Input Data Set Processing services 518, such as
  a process or service to obtain a set of images for processing;
  a process or service to evaluate each image using a trained image classifier or other form of model;
  a process or service to obtain a written report of a 1st human evaluation of each image;
  a process or service to evaluate the written report using a trained text classifier or other form of model;
    each model/classifier generates as an output a probability, confidence level, metric or other value representing the likelihood that an input represents a positive or negative example;
  a process or service to compare the output of the image and the text classifier—if the outputs of the image and text classifier do not agree for an image, then obtain an evaluation of the image by a 2nd human;
Apply Expectation-Maximization Technique to Data Set services 520, such as
  a process or service to define binary random variables and factoring of joint distribution(s). In one embodiment, this may comprise;
    Collect Frequencies for Observed Variables
    Define Joint Distribution between Latent and Observed Variables using Conditional Independence Assumptions;
  a process or service to generate initializations for a set of distributions;
  a process or service to, for each initialized distribution, perform expectation and maximization steps to convergence;
  a process or service to select output of the Expectation-Maximization technique that maximizes the likelihood of the observed data;
  a process or service to present the selected output to the provider of the input data for consideration;
Administrative services 522, such as
  a process or services to enable the provider of the services and/or the platform to administer and configure the processes and services provided to users, such as by altering how the expectation-maximization technique is implemented, etc.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is most often a combination of hardware and the software that helps deliver content, commonly by hosting a website, to client web browsers that access the web server via the Internet.

FIG. 6 is a diagram illustrating elements or components of an example operating environment 600 in which an embodiment may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the data analysis and evaluation services and processing described herein) are provided to users, with each business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment may be implemented. The software architecture shown in FIG. 7 represents an example of an architecture which may be used to implement an embodiment. In general, an embodiment may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the inventive system and methods, such as for one or more of the processes or functions described with reference to the Figures.

Note that in some embodiments or implementations, the following steps, processes, or functions may be performed in a different order than that presented below; for example, an image may be evaluated before, after, or substantially contemporaneously with evaluation of the written report:

Obtain a Set of Images for Processing;
    Evaluate Each Image Using a Trained Image Classifier or other form of model (e.g., a model trained to detect the presence of a nodule in a lung or other feature in an image);
Obtain a Written Report of a $1^{st}$ Human Evaluation of Each Image;
    Evaluate the Written Report Using a Text Classifier or other form of NLP/NLU model to determine if the $1^{st}$ Human Evaluator Described Finding Nodule (or feature) in Their Review of the Image;
If the Outputs of the Image and Text Classifier/Models Do Not Agree for an Image, Then Evaluate the Image by a $2^{nd}$ Human and Obtain Their Evaluation (which is assumed to be correct);
Use the Expectation-Maximization Technique to Estimate the Performance of $1^{st}$ Human and Image Classifier Given: (1) Performance of Text Classifier/Model or (2) Output of $1^{st}$ and $2^{nd}$ Text Classifiers/Models;
Based on Case (1) or (2), Define Binary Random Variables and Factoring of Joint Distribution of Variables (for example, Collect Frequencies for Observed Variables, and Define Joint Distribution between Latent and Observed Variables using Conditional Independence Assumptions);
Generate Initializations for Set of Distributions;
For Each Generated Initialization, Perform Expectation and Maximization Steps to Convergence;
Select Output of Expectation-Maximization Technique that maximizes the likelihood of the Observed Data; and
Present Selected Output to User—If Desired, Provide Recommendation Whether the Image Classifier and/or $1^{st}$ Human Evaluation is Reliable Enough for the Task.

As mentioned, although in some embodiments, an image is described as an x-ray, embodiments comprise those in which the image is an X-ray (Computed Radiography, Digital Radiography), a CT (Computed Tomography) scan, a MR (Magnetic Resonance) scan, a US (Ultrasound) image, a MG (Mammography) image, or a photograph, among other examples. Further, in situations in which the report contains a code, symbol, alphanumeric string, or similar data, the trained text classifier may operate as a text recognition, text representation, text interpretation or pattern recognition/matching model.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

A non-limiting example of a use of the disclosed system and methods is described in the following sections. The disclosed technique is of value in situations where humans manually enter a label, for example, an indication whether a CT scan contains a lung nodule; whether a product contains a defect; or whether an image contains offensive content. It is assumed that separately from the human-generated labels, it is possible to generate machine labels corresponding to purpose of the human labels. For example, in the setting of CT scans, it is assumed that there is at least one image classifier, which generates a label for whether the CT scan contains a lung nodule (or other feature for which it has been trained). Using the information from the image classifier, combined with the human labels, a goal is to infer the error rate for the human decision-maker, for example, how often the human decision-maker misses a lung nodule.

There are two primary difficulties which can arise when trying to estimate the human error rate. First, the human label may be delivered in unstructured text, for example, in the form of a radiology report. It may be non-trivial to extract a binary label from this unstructured text. Second, the image classifier will, in general, make errors. For example, the machine classifier for determining whether the CT scan contains a lung nodule may make errors.

Example Medical Imaging Study

To illustrate an embodiment and the general approach, consider an example study involving a radiology error-detection system that utilizes the techniques disclosed herein. The system is designed to identify studies in which a radiological finding occurs in a study, but the radiologist does not detect it. This results in a missed finding. In this example, the focus is on a system for detecting missed lung nodules in chest and abdominal CT scans.

The system uses two machine learning classifiers: a vision or image classifier which labels whether a study image contains a lung nodule, and a natural language processing (NLP) or text classifier which labels whether a radiology report describes the presence of a lung nodule (in the associated study image). Given a study image and its paired radiologist-generated report, the vision classifier labels the study image, and the NLP classifier labels the report. A flag is generated if the vision classifier detects a nodule in the image, but the NLP does not detect a nodule mentioned in the report. If these conditions do not hold (either the vision classifier does not detect a nodule, or the NLP detects that a nodule has been mentioned in the report), then no flag is generated.

After a flag is generated, a human radiologist examines the flagged study to determine whether the system was correct. They provide a manually generated label, indicating whether a true missed nodule (i.e., missed by the human evaluator, as expressed in the written report) was identified, or whether one of the component machine learning systems made an error. When a true missed nodule is identified, the relevant doctors will be notified so that the patient can receive appropriate care.

Example of a Use Case or Task

The system would like to understand two things: 1) the performance characteristics of its machine learning systems, and 2) the error rate of hospitals/radiologists who read imaging studies, as indicated by evaluation of their written reports. This disclosure describes how both quantities can be estimated from data collected from a hospital. In some embodiments, the system may collect the following data from hospitals:

1. The total flag rate (NLP classifier is negative, and vision classifier is positive);
2. The true flag rate (a flag was generated, and it represents a true missed nodule, as determined by an independent human evaluator);
3. The false flag rate caused by the NLP classifier (a nodule is present in the image, but the report was flagged incorrectly as indicating that no nodule was described by the radiologist);
4. The false flag rate caused by the vision classifier (a nodule is not present in the image, but the image classifier output is positive);
5. The distribution of classifications that do not result in a flag (how often the NLP and vision classifiers are both negative, both positive, for example).

Below are described two methods for using these statistics to estimate machine learning and radiologist performance.

There are substantial challenges in estimating machine learning and radiologist performance from this data. Consider first the problem of estimating radiologist performance. A naive manner of estimating this quantity would look at the directly labeled data which is available: the studies that were flagged by the system, and subsequently given ground-truth labels by a human (the second human evaluator). In this scenario, the radiologist miss rate would be computed by considering how often true flags occur (i.e., flags in which the radiologist missed a nodule), as a proportion of all studies that were examined by the system.

This method may severely underestimate the true radiologist miss rate. Due to limitations of the machine learning classifiers, the system only catches a fraction of the radiologist misses that occur. The vision classifier will miss a fraction of the nodules that occur in studies. Some of these classifier-missed nodules will also be missed by radiologists, and as a result the overall system will not identify these radiologist misses.

A similar issue will occur during estimation of the machine learning classifier performance values. Consider the problem of estimating vision classifier performance from the labeled data. The true positive rate is the rate of positive studies which are correctly labeled by the classifier, as a fraction of all positive studies. From the explicitly labeled data, this is the sum of true flags and false flags caused by NLP, divided by the total number of flags.

This approach will give an estimate of the true positive rate which may be significantly mistaken. Consider a scenario in which the true positive rate for the visual classifier is 0.1, but the false positive rate is 0. In this situation, all flags will either be true flags, or flags caused by errors in NLP. Therefore, the estimated true positive rate of the visual classifier will be 1—even though the actual true positive rate is much lower.

Method 1: Estimating radiologist and vision performance given known NLP performance.

The first method assumes that we know the true performance characteristics of the NLP classifier. This means that we know both the true positive rate (TPR) and false positive rate (FPR) to within some level of accuracy.

Given this assumption, the disclosed method can recover the following information:
1. The performance (TPR and FPR) of the visual classifier; and
2. The error rate of the radiologist.

The method has desirable characteristics. It is robust to errors in the assumed performance of the NLP classifier. It will be possible to independently estimate the performance of NLP using independent methods, for example, by evaluating its performance on a labeled set of sentences. Due to sampling error or shift in the data distribution, the NLP performance estimate derived from these methods may not be totally accurate. In this situation, our method nonetheless recovers relatively accurate performance estimates for the visual classifier and radiologist. In simulations, the error propagates linearly or sub-linearly, meaning that small errors in the NLP estimate produce small errors in the visual classifier and radiologist estimates.

Method 2: Estimating radiologist and classifier performance given two NLP classifiers. A second method does not assume that we know the ground truth performance of the NLP classifier. Instead, it assumes that we can run our system using two distinct NLP classifiers. The proposed workflow is the following:

Each study report is read by two NLP classifiers;
A flag is generated if the visual classifier is positive, and either NLP classifier is negative; and
Flags are scored using the normal method.

By collecting data on flags generated by this system, the disclosed method is able to estimate the performance of the following aspects of the system:
1. The performance (TPR and FPR) of each of the NLP classifiers;
2. The performance of the visual classifiers; and
3. The error rate of the radiologist.

The primary limitation of this approach is that it will result in a higher flag rate, and potentially a higher false flag rate.

To estimate these quantities, we make some assumptions about the probabilistic structure of the variables. Because the two methods have different sets of variables, they are considered separately.

Assumptions for Method 1

Method 1 assumes the following binary random variables:
S=Study (is the study positive or negative)
R=Report (is the radiologist report positive or negative)
V=Vision algorithm (did the vision algorithm detect a nodule in the study)
N=Natural language processing algorithm (did the NLP algorithm detect a nodule described in the report)

The method assumes that the joint distribution on these variables can be factored in the following manner:

$P(S,R,V,N)=P(S)P(R|S)P(V|S)P(N|R)$

This equation implies several important conditional independence conditions among the variables. For example, it implies that conditioned on the study value S (whether the study is positive or negative), the report variable R and vision variable V are independent of each other. The method assumes that we have (approximate) prior knowledge of distribution $P(N|R)$, i.e., knowledge of the true positive rate and false positive rate for the NLP algorithm. Given knowledge of $P(N|R)$, the method estimates the remaining distributions: $P(S)$, $P(R|S)$, $P(V|S)$. The method therefore estimates the prevalence of positive studies in the population ($P(S)$); the true positive rate and false positive rate for the human decision-maker ($P(R|S)$); and the true positive and false positive rate for the vision algorithm ($P(V|S)$).

Assumptions for Method 2

Method 2 assumes the same set of random variables as Method 1, with the following exceptions. Instead of a single natural language processing algorithm, the method assumes that there are two distinct algorithms:
$N_1$=NLP algorithm 1
$N_2$=NLP algorithm 2

These two algorithms are not assumed to be independent but are assumed to be sufficiently distinct from each other. The distinctness condition is that the algorithms can disagree with each other with positive probability:

$P(N_1=T,N_2=F)>0 P(N_1=F,N_2=T)>0$

Given the two NLP algorithms, we assume a similar conditional independence structure to Method 1:

$P(S,R,V,N_1,N_2)=P(S)P(R|S)P(V|S)P(N_1,N_2|R)$

Note that the two NLP algorithms are not assumed to be conditionally independent of each other given the value of the report R, though they are assumed to be conditionally independent of the other variables given R. Method 2 estimates the distributions:

$P(S),P(R|S),P(V|S),P(N_1,N_2|R).$

Unlike Method 1, it does not assume that we know the true positive rate and false positive rate for the NLP algorithms.

Estimation Procedure

Both methods use the same general procedure for estimating the unknown distributions: expectation-maximization. This is an iterative method, which makes an initial guess for the values of the different distributions, and then optimizes the distributions to maximize the likelihood of the data. The dataset is generated in the following manner. Our description applies to Method 1 but can easily be extended to Method 2. For the i'th study that is processed in the hospital, there is a collection of variables associated with this study: $S_i$, $R_i$, $V_i$, $N_i$. For example, $R_i$ is the true value of the report (positive or negative) for the i'th study. Our dataset consists of a set of observations $X_1, \ldots, X_n$, where each $X_i$ contains information about a subset of the variables in the model. For example, when the system generates a flag, we observe the variables $S_i$, $R_i$, $V_i$, $N_i$. On the other hand, when the system does not generate a flag, we only observe $V_i$, $N_i$, which are the variables corresponding to the output of the two classifiers.

E(xpectation)-Step

In the E-step, we compute the expected value of all latent variables. All distributions are assumed to be either initialized to some value (prior to the EM algorithm) or computed from the M-step (described in the next section). Given these distributions, for each observation $X_i$ and each setting of latent variables $Y_i$, we calculate the posterior probability of $Y_i$:

$$P(Y_i|X_i) = \frac{\hat{P}(Y_i, X_i)}{\sum_j \hat{P}(Y_j, X_i)}$$

M(aximization)-Step

In the M-step, we use the latent variable expectations calculated in the E-step, in order to compute maximum-likelihood estimates for the conditional distributions. Let P(A|B) indicate the conditional distribution being estimated. We will use the notation (A=a, B=b)∈Y to indicate that the setting of variables A and B is compatible with the setting of the variables in Y. The maximum likelihood update can then be calculated by:

$$\hat{P}(A=a \mid B=b) = \frac{1}{n}\sum_{n=1}^{n}\sum_{(A=a, B=b) \in Y_i} P(Y_i \mid X_i)$$

With regards to latent and observed variables in a study that collects the pairs of data, some of the described variables are always observed, i.e., for every study that is run through the system, the value of the variable is observed. For example, the variable V (the image classifier or vision algorithm (V) output) is always observed. For each study, one can know whether the vision algorithm outputs positive or negative.

However, other variables are sometimes observed and sometimes latent (i.e., unobserved). The study variable S (whether the study does in fact contain a lung nodule) is sometimes latent. In situations where the NLP classifier and visual classifier agree with each other, the disclosed approach does not perform a manual evaluation of the study, so the true value of S is not known. In situations where there is a discrepancy between the language (e.g., NLP) and image (visual) classifiers, the approach performs a manual evaluation of the study, and the value of S is therefore known.

With regards to maximizing the likelihood of observed data, suppose that 100 studies are evaluated by an embodiment of the disclosed system. For each of these studies, some variables will be observed, and some variables will be unobserved. The system collects the observed variables across these studies (i.e., the observed data). The approach then constructs a statistical model to fit this data. The statistical model makes predictions: it says that certain types of observations are likely, and certain types of observations are unlikely. The approach then considers many different statistical models, and measures how well each model's predictions match the observed data. This allows selection of the model whose predictions most closely match the data.

It should be understood that the embodiments as described herein can be implemented in the form of control logic using computer software in a modular or integrated manner. Based on the disclosure and teachings provided herein, a person of ordinary skill in the art will know and appreciate other ways and/or methods to implement one or more embodiments using hardware and a combination of hardware and software.

In some embodiments, certain of the methods, models or functions described herein may be embodied in the form of a trained neural network or machine learning (ML) model, where the network or model is implemented by the execution of a set of computer-executable instructions. The set of instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" or nodes that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

A machine learning model is a set of layers of connected neurons that operate to make a decision (such as a classification) regarding a sample of input data. A model is typically trained by inputting multiple examples of input data and an associated correct "response" or decision regarding each set of input data. Thus, each input data example is associated with a label or other indicator of the correct response that a properly trained model should generate. The examples and labels are input to the model for purposes of training the model. When trained (i.e., the weights connecting neurons have converged and become stable or within an acceptable amount of variation), the model will operate to respond to an input sample of data to generate the correct label or classification as an output.

The disclosure includes the following clauses and embodiments:

Clause 1. A method for evaluating an error rate of human-generated data used with a machine learning classifier, comprising:

obtaining a set of pairs of data, wherein each pair comprises an image and human-generated text describing an aspect of the image;

for each pair of data, evaluating the image in the pair using a trained image classifier and evaluating the text in the pair using a trained language classifier;

identifying one or more of the pairs of data for which there is a discrepancy between the evaluation by the trained image classifier and the evaluation by the trained language classifier;

for each of the identified pairs of data, obtaining a human-generated label of the image in the pair of data, where the human-generated label represents a second text describing the aspect of the image;

forming a joint distribution of the image and language classifier evaluations;

obtaining a performance characteristic of the language classifier; and based on the human-generated labels, the joint distribution, and the performance characteristic, generating an estimate of the expected occurrence of each image classification by the image classifier, an error rate in the human-generated text describing the aspect of the image, or the performance of the image classifier.

Clause 2. The method of clause 1, wherein the image in each pair of data is an x-ray, the text describing the aspect of the image is a report, and the aspect is the presence or absence of a nodule in the image.

Clause 3. The method of clause 1, wherein the image in each pair of data is an image of a scene, the text describing the aspect of the image is a report, and the aspect is the presence or absence of a person, animal, event, or object in the scene.

Clause 4. The method of clause 1, wherein generating an estimate of the expected occurrence of each image classification by the image classifier, an error rate in the human-generated text describing the aspect of the image, or the performance of the image classifier further comprises:

defining a joint distribution between latent and observed variables of the image using a conditional independence assumption;

generating a set of initializations for the joint distribution;

for each generated initialization, performing an expectation operation;

for each result of an expectation operation, performing a maximization operation;

repeating the expectation and maximization steps for each initialization until a state of convergence is reached;

identifying an output of the expectation and maximization steps corresponding to each initialization; and selecting the output of the expectation and maximization steps corresponding to each initialization that maximizes the likelihood of observed data.

Clause 5. The method of clause 1, wherein the performance characteristic of the language classifier is replaced by an output from a first language classifier and an output from a second language classifier, and wherein the method estimates the expected occurrence of each image classification by the image classifier, an error rate in the human-generated text describing the aspect of the image, the performance of the two language classifiers, or the performance of the image classifier.

Clause 6. The method of clause 1, wherein identifying one or more of the pairs of data for which there is a discrepancy between the evaluation by the trained image classifier and the evaluation by the trained language classifier further comprises identifying one or more pairs of data for which an output of the trained image classifier regarding the presence or absence of the aspect of the image differs from the output of the trained language classifier.

Clause 7. A system for evaluating an error rate of human-generated data used with a machine learning classifier, comprising:

one or more electronic processors configured to execute a set of computer-executable instructions;

the set of computer-executable instructions, wherein when executed, the instructions cause the one or more electronic processors to obtain a set of pairs of data, wherein each pair comprises an image and human-generated text describing an aspect of the image;

for each pair of data, evaluate the image in the pair using a trained image classifier and evaluating the text in the pair using a trained language classifier;

identify one or more of the pairs of data for which there is a discrepancy between the evaluation by the trained image classifier and the evaluation by the trained language classifier;

for each of the identified pairs of data, obtain a human-generated label of the image in the pair of data, where the human-generated label represents a second text describing the aspect of the image;

form a joint distribution of the image and language classifier evaluations;

obtain a performance characteristic of the language classifier; and based on the human-generated labels, the joint distribution, and the performance characteristic, generate an estimate of the expected occurrence of each image classification by the image classifier, an error rate in the human-generated text describing the aspect of the image, or the performance of the image classifier.

Clause 8. The system of clause 7, wherein the image in each pair of data is an x-ray, the text describing the aspect of the image is a report, and the aspect is the presence or absence of a nodule in the image.

Clause 9. The system of clause 7, wherein the image in each pair of data is an image of a scene, the text describing the aspect of the image is a report, and the aspect is the presence or absence of a person, animal, event, or object in the scene.

Clause 10. The system of clause 7, wherein generating an estimate of the expected occurrence of each image classification by the image classifier, an error rate in the human-generated text describing the aspect of the image, or the performance of the image classifier further comprises:

defining a joint distribution between latent and observed variables of the image using a conditional independence assumption;

generating a set of initializations for the joint distribution;

for each generated initialization, performing an expectation operation;

for each result of an expectation operation, performing a maximization operation;

repeating the expectation and maximization steps for each initialization until a state of convergence is reached;

identifying an output of the expectation and maximization steps corresponding to each initialization; and selecting the output of the expectation and maximization steps corresponding to each initialization that maximizes the likelihood of observed data.

Clause 11. The system of clause 7, wherein the performance characteristic of the language classifier is replaced by an output from a first language classifier and an output from a second language classifier, and wherein the method estimates the expected occurrence of each image classification by the image classifier, an error rate in the human-generated text describing the aspect of the image, the performance of the two language classifiers, or the performance of the image classifier.

Clause 12. The system of clause 7, wherein identifying one or more of the pairs of data for which there is a discrepancy between the evaluation by the trained image classifier and the evaluation by the trained language classifier further comprises identifying one or more pairs of data for which an output of the trained image classifier regarding the presence or absence of the aspect of the image differs from the output of the trained language classifier.

Clause 13. A set of computer-executable instructions that when executed by one or more programmed electronic processors, cause the processors to evaluate an error rate of human-generated data used with a machine learning classifier by:

obtaining a set of pairs of data, wherein each pair comprises an image and human-generated text describing an aspect of the image;

for each pair of data, evaluating the image in the pair using a trained image classifier and evaluating the text in the pair using a trained language classifier;

identifying one or more of the pairs of data for which there is a discrepancy between the evaluation by the trained image classifier and the evaluation by the trained language classifier;

for each of the identified pairs of data, obtaining a human-generated label of the image in the pair of data, where the human-generated label represents a second text describing the aspect of the image;

forming a joint distribution of the image and language classifier evaluations;

obtaining a performance characteristic of the language classifier; and based on the human-generated labels, the joint distribution, and the performance characteristic, generating an estimate of the expected occurrence of each image classification by the image classifier, an error rate in the human-generated text describing the aspect of the image, or the performance of the image classifier.

Clause 14. The set of computer-executable instructions of clause 13, wherein the image in each pair of data is an x-ray, the text describing the aspect of the image is a report, and the aspect is the presence or absence of a nodule in the image.

Clause 15. The set of computer-executable instructions of clause 13, wherein the image in each pair of data is an image of a scene, the text describing the aspect of the image is a report, and the aspect is the presence or absence of a person, animal, event, or object in the scene.

Clause 16. The set of computer-executable instructions of clause 13, wherein generating an estimate of the expected occurrence of each image classification by the image classifier, an error rate in the human-generated text describing the aspect of the image, or the performance of the image classifier further comprises:

defining a joint distribution between latent and observed variables of the image using a conditional independence assumption;

generating a set of initializations for the joint distribution;

for each generated initialization, performing an expectation operation;

for each result of an expectation operation, performing a maximization operation;

repeating the expectation and maximization steps for each initialization until a state of convergence is reached;

identifying an output of the expectation and maximization steps corresponding to each initialization; and selecting the output of the expectation and maximization steps corresponding to each initialization that maximizes the likelihood of observed data.

Clause 17. The set of computer-executable instructions of clause 13, wherein the performance characteristic of the language classifier is replaced by an output from a first language classifier and an output from a second language classifier, and wherein the method estimates the expected occurrence of each image classification by the image classifier, an error rate in the human-generated text describing the aspect of the image, the performance of the two language classifiers, or the performance of the image classifier.

Clause 18. The set of computer-executable instructions of clause 13, wherein identifying one or more of the pairs of data for which there is a discrepancy between the evaluation by the trained image classifier and the evaluation by the trained language classifier further comprises identifying one or more pairs of data for which an output of the trained image classifier regarding the presence or absence of the aspect of the image differs from the output of the trained language classifier.

Clause 19. The method of clause 1, wherein the image is one of an X-ray, a computed radiography image, a digital radiography image, a computed tomography scan, a magnetic resonance scan, an ultrasound image, a mammography image, or a photograph.

Clause 20. The system of clause 7, wherein the image is one of an X-ray, a computed radiography image, a digital radiography image, a computed tomography scan, a magnetic resonance scan, an ultrasound image, a mammography image, or a photograph.

Clause 21. The set of computer-executable instructions of clause 13, wherein the image is one of an X-ray, a computed radiography image, a digital radiography image, a computed tomography scan, a magnetic resonance scan, an ultrasound image, a mammography image, or a photograph.

Any of the software components, processes or functions described in this application may be implemented as software code to be executed by a processor using any suitable computer language such as Python, Java, JavaScript, C, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network. Further, the set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HDDVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein in the specification, figures, and claims, the term "or" is used inclusively to refer items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the disclosure is not limited to the embodiments described above or depicted in the drawings, and various embodiments and modifications can be made without departing from the scope of the claims below.

That which is claimed is:

1. A method for evaluating an error rate of human-generated data used with a machine learning classifier, comprising:
   obtaining a set of pairs of data, wherein each pair comprises an image and human-generated text describing an aspect of the image;
   for each pair of data, evaluating the image in the pair using a trained image classifier and evaluating the human-generated text in the pair using a trained language classifier;
   identifying one or more of the pairs of data for which there is a discrepancy between the evaluation by the trained image classifier and the evaluation by the trained language classifier;
   for each of the identified pairs of data, obtaining a human-generated label of the image in the pair of data, where the human-generated label represents a second text describing the aspect of the image;
   forming a joint distribution of the trained image classifier and the trained language classifier evaluations;
   obtaining a performance characteristic of the trained language classifier; and based on the human-generated labels, the joint distribution, and the performance characteristic, generating one or more of an estimate of the expected occurrence of each classification by the image classifier, an error rate in the human-generated text describing the aspect of the image, or a performance of the trained image classifier, to determine accuracy of the machine learning classifier's performance at correctly classifying input data and/or accuracy of human's ability to classify data which is used in training of the machine learning classifier, wherein the generating the one or more of the estimate of the expected occurrence of the each image classification by the trained image classifier, the error rate in the human-generated text describing the aspect of the image, or the performance of the trained image classifier further comprises:

defining a joint distribution between latent and observed variables of the image using an assumption of conditional independence;

generating a set of initializations for the joint distribution;

for each generated initialization in the set of initializations, performing an expectation operation;

for each result of performing an expectation operation, performing a maximization operation;

repeating the expectation operation and maximization operation for each generated initialization until a state of convergence is reached;

identifying an output of the expectation operation and the maximization operation corresponding to each generated initialization; and selecting the output of the expectation operation and the maximization operation corresponding to each generated that maximizes the likelihood of observed data.

2. The method of claim 1, wherein the image in each pair of data is an x-ray, the text describing the aspect of the image is a report, and the aspect is the presence or absence of a nodule in the image.

3. The method of claim 1, wherein the image in each pair of data is an image of a scene, the text describing the aspect of the image is a report, and the aspect is the presence or absence of a person, animal, event, or object in the scene.

4. The method of claim 1, wherein the performance characteristic of the trained language classifier is instead an output from a first language classifier and an output from a second language classifier, and wherein the method estimates one or more of the expected occurrence of one or more of each image classification by the trained image classifier, an error rate in the human-generated text describing the aspect of the image, the performance of the first language classifier and the second language classifier, or the performance of the trained image classifier.

5. The method of claim 1, wherein the identifying one or more of the pairs of data for which there is a discrepancy between the evaluation by the trained image classifier and the evaluation by the trained language classifier further comprises identifying one or more pairs of data for which an output of the trained image classifier regarding the presence or absence of the aspect of the image differs from the output of the trained language classifier.

6. The method of claim 1, wherein the image is one of an X-ray, a computed radiography image, a digital radiography image, a computed tomography scan, a magnetic resonance scan, an ultrasound image, a mammography image, or a photograph.

7. A system for evaluating an error rate of human-generated data used with a machine learning classifier, comprising:

one or more electronic processors configured to execute a set of computer-executable instructions, stored in a memory;

the set of computer-executable instructions, wherein when executed, the instructions cause the one or more electronic processors to obtain a set of pairs of data, wherein each pair comprises an image and human-generated text describing an aspect of the image;

for each pair of data, evaluate the image in the pair using a trained image classifier and evaluating the human-generated text in the pair using a trained language classifier;

identify one or more of the pairs of data for which there is a discrepancy between the evaluation by the trained image classifier and the evaluation by the trained language classifier;

for each of the identified pairs of data, obtain a human-generated label of the image in the pair of data, where the human-generated label represents a second text describing the aspect of the image;

form a joint distribution of the trained image classifier and the trained language classifier evaluations;

obtain a performance characteristic of the trained language classifier;

based on the human-generated labels, the joint distribution, and the performance characteristic, generate one or more of an estimate of the expected occurrence of each classification by the image classifier, an error rate in the human-generated text describing the aspect of the image, or a performance of the trained image classifier, to determine accuracy of the machine learning classifier's performance at correctly classifying input data and/or accuracy of human's ability to classify data which is used in training of the machine learning classifier, wherein the generating the one or more of the estimate of the expected occurrence of the each image classification by the trained image classifier, the error rate in the human-generated text describing the aspect of the image, or the performance of the trained image classifier further comprises:

defining a joint distribution between latent and observed variables of the image using an assumption of conditional independence;

generating a set of initializations for the joint distribution;

for each generated initialization in the set of initializations, performing an expectation operation;

for each result of performing an expectation operation, performing a maximization operation;

repeating the expectation operation and maximization operation for each generated initialization until a state of convergence is reached;

identifying an output of the expectation operation and the maximization operation corresponding to each generated initialization; and selecting the output of the expectation operation and the maximization operation corresponding to each generated that maximizes the likelihood of observed data.

8. The system of claim 7, wherein the image in each pair of data is an x-ray, the text describing the aspect of the image is a report, and the aspect is the presence or absence of a nodule in the image.

9. The system of claim 7, wherein the image in each pair of data is an image of a scene, the text describing the aspect of the image is a report, and the aspect is the presence or absence of a person, animal, event, or object in the scene.

10. The system of claim 7, wherein the performance characteristic of the trained language classifier is instead an output from a first language classifier and an output from a second language classifier, and wherein the system estimates one or more of the expected occurrence of each image classification by the trained image classifier, an error rate in the human-generated text describing the aspect of the image, the performance of the first language classifier and the second language classifiers, or the performance of the trained image classifier.

11. The system of claim 7, wherein the identifying one or more of the pairs of data for which there is a discrepancy between the evaluation by the trained image classifier and the evaluation by the trained language classifier further comprises identifying one or more pairs of data for which an output of the trained image classifier regarding the presence or absence of the aspect of the image differs from the output of the trained language classifier.

12. The system of claim 7, wherein the image is one of an X-ray, a computed radiography image, a digital radiography image, a computed tomography scan, a magnetic resonance scan, an ultrasound image, a mammography image, or a photograph.

13. A set of computer-executable instructions, stored in a memory that when executed by one or more programmed electronic processors, cause the processors to evaluate an error rate of human-generated data used with a machine learning classifier by:
obtain a set of pairs of data, wherein each pair comprises an image and human-generated text describing an aspect of the image;
for each pair of data, evaluate the image in the pair using a trained image classifier and evaluating the human-generated text in the pair using a trained language classifier;
identify one or more of the pairs of data for which there is a discrepancy between the evaluation by the trained image classifier and the evaluation by the trained language classifier;
for each of the identified pairs of data, obtain a human-generated label of the image in the pair of data, where the human-generated label represents a second text describing the aspect of the image;
form a joint distribution of the trained image classifier and the trained language classifier evaluations;
obtain a performance characteristic of the trained language classifier;
based on the human-generated labels, the joint distribution, and the performance characteristic, generate one or more of an estimate of the expected occurrence of each classification by the image classifier, an error rate in the human-generated text describing the aspect of the image, or a performance of the trained image classifier, to determine accuracy of the machine learning classifier's performance at correctly classifying input data and/or accuracy of human's ability to classify data which is used in training of the machine learning classifier, wherein the generating the one or more of the estimate of the expected occurrence of the each image classification by the trained image classifier, the error rate in the human-generated text describing the aspect of the image, or the performance of the trained image classifier further comprises:
defining a joint distribution between latent and observed variables of the image using an assumption of conditional independence;
generating a set of initializations for the joint distribution;
for each generated initialization in the set of initializations, performing an expectation operation;
for each result of performing an expectation operation, performing a maximization operation;
repeating the expectation operation and maximization operation for each generated initialization until a state of convergence is reached;
identifying an output of the expectation operation and the maximization operation corresponding to each generated initialization; and
selecting the output of the expectation operation and the maximization operation corresponding to each generated that maximizes the likelihood of observed data.

14. The set of computer-executable instructions of claim 13, wherein the image in each pair of data is an x-ray, the text describing the aspect of the image is a report, and the aspect is the presence or absence of a nodule in the image.

15. The set of computer-executable instructions of claim 13, wherein the image in each pair of data is an image of a scene, the text describing the aspect of the image is a report, and the aspect is the presence or absence of a person, animal, event, or object in the scene.

16. The set of computer-executable instructions of claim 13, wherein the performance characteristic of the trained language classifier is instead an output from a first language classifier and an output from a second language classifier, and wherein the method estimates one or more of the expected occurrence of each image classification by the trained image classifier, an error rate in the human-generated text describing the aspect of the image, the performance of the first language classifier and the second language classifier, or the performance of the trained image classifier.

17. The set of computer-executable instructions of claim 13, wherein the identifying one or more of the pairs of data for which there Is a discrepancy between the evaluation by the trained image classifier and the evaluation by the trained language classifier further comprises identifying one or more pairs of data for which an output of the trained image classifier regarding the presence or absence of the aspect of the image differs from the output of the trained language classifier.

18. The set of computer-executable instructions of claim 13, wherein the image is one of an X-ray, a computed radiography image, a digital radiography image, a computed tomography scan, a magnetic resonance scan, an ultrasound image, a mammography image, or a photograph.

* * * * *